United States Patent
Poolla et al.

(10) Patent No.: US 10,657,265 B1
(45) Date of Patent: May 19, 2020

(54) OUTPUTTING INTERNAL STATES OF AN INTEGRATED CIRCUIT AFTER INITIATION OF A SECURE LOCKDOWN MODE

(71) Applicant: Xilinx, Inc., San Jose, CA (US)

(72) Inventors: Ramakrishna G. Poolla, Hyderabad (IN); Krishna C. Patakamuri, Hyderabad (IN)

(73) Assignee: XILINX, INC., San Jose, CA (US)

( * ) Notice: Subject to any disclaimer, the term of this patent is extended or adjusted under 35 U.S.C. 154(b) by 164 days.

(21) Appl. No.: 15/848,304

(22) Filed: Dec. 20, 2017

(51) Int. Cl.
| | |
|---|---|
| G06F 21/00 | (2013.01) |
| G06F 21/57 | (2013.01) |
| G06F 21/74 | (2013.01) |
| G06F 21/60 | (2013.01) |
| G06F 3/06 | (2006.01) |

(52) U.S. Cl.
CPC .......... *G06F 21/577* (2013.01); *G06F 3/0619* (2013.01); *G06F 21/602* (2013.01); *G06F 21/74* (2013.01); *G06F 2221/2107* (2013.01)

(58) Field of Classification Search
None
See application file for complete search history.

(56) References Cited

U.S. PATENT DOCUMENTS

| | | | |
|---|---|---|---|
| 2007/0226795 A1* | 9/2007 | Conti | G06F 21/554 726/22 |
| 2018/0034793 A1* | 2/2018 | Kibalo | G06F 21/575 |
| 2019/0103966 A1* | 4/2019 | Zimny | H04L 9/30 |

OTHER PUBLICATIONS

Xilinx, Inc., "Zynq UltraScale+ MPSoC Software Developer Guide" (hereinafter "Software Developers Guide") UG1137 (v4.0) May 3, 2017, pp. 1-451, San Jose, CA, USA.

* cited by examiner

*Primary Examiner* — Andrew J Steinle
(74) *Attorney, Agent, or Firm* — W. Eric Webostad (57) ABSTRACT

Method and system generally relating to integrated circuits are disclosed. In such a method, a secure lockdown mode for the integrated circuit is initiated. System states of a system internal to the integrated circuit are obtained after initiation of the secure lockdown mode. This obtaining of the system states includes: reading out of the system states from storage devices internal to the integrated circuit; and loading the system states into temporary storage of the integrated circuit. The system states are output via a port of the integrated circuit before closing the port responsive to the secure lockdown mode.

20 Claims, 6 Drawing Sheets

OUTPUTTING INTERNAL STATES OF AN INTEGRATED CIRCUIT AFTER INITIATION OF A SECURE LOCKDOWN MODE

FIELD OF THE INVENTION

The following description relates to integrated circuit devices ("ICs"). More particularly, the following description relates to outputting internal states of an integrated circuit after initiation of a secure lockdown mode.

BACKGROUND

Integrated circuits have become more secure over time. However, a secure lockdown mode of an integrated circuit may cause same to be reset thereby losing internal system information of such integrated circuit. Such internal system information may be useful, such as for debugging for example.

SUMMARY

A method generally relates to an integrated circuit. In such a method, a secure lockdown mode for the integrated circuit is initiated. System states of a system internal to the integrated circuit are obtained after initiation of the secure lockdown mode. This obtaining of the system states includes: reading out of the system states from storage devices internal to the integrated circuit; and loading the system states into temporary storage of the integrated circuit. The system states are output via a port of the integrated circuit before closing the port responsive to the secure lockdown mode.

A system generally relates to an integrated circuit. In such a system, a memory is configured to store program code. A security engine has a processor coupled to the memory. The processor, in response to executing the program code, is configured to initiate operations for implementing a secure lockdown mode of the integrated circuit. The operations include obtaining system states of a system internal to the integrated circuit after initiation of the secure lockdown mode. The obtaining includes: reading out the system states from storage devices internal to the integrated circuit; and loading the system states into temporary storage of the integrated circuit. The operations further include outputting the system states via a port of the integrated circuit before closing the port responsive to the secure lockdown mode.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-1 is a block diagram depicting an exemplary processing system.

FIG. 1-2 is a block diagram depicting an exemplary security unit subsystem.

FIG. 2-1 is a flow diagram depicting an exemplary internal states output flow for output from an integrated circuit.

FIG. 2-2 is a flow diagram depicting an exemplary initiation of a secure lockdown mode flow.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Before describing the examples illustratively depicted in the several figures, a general introduction is provided to further understanding.

Before loading a boot image, an on-chip boot read-only memory embedded in an integrated circuit, such as for example a system-on-a chip, may configure such integrated circuit to check integrity of such boot image through authentication and/or decryption. If such bootable or boot image, or any partition to be loaded by a boot read-only memory configured system-on-a chip, has been tampered with or otherwise hacked, such system-on-a chip configured by and executing out of boot read-only memory puts such system-on-a chip into a secure lockdown mode or state.

Along those lines, a secure lockdown mode may clear all internal storage devices of a system-on-a chip having security related information. Such internal storage devices may include one or more of on-chip memory, error registers, processor stack registers, key registers, log memory, and/or the like. Accordingly, internal states of such a system-on-a chip are cleared. Further, a secure lockdown mode may cause a system-on-a chip to perform a system reset internally to avoid an unwanted boot. Thus, determining a reason behind initiation of a lockdown or other information for debugging was difficult, as internal states of a system-on-a chip were not extractable due to a secure lockdown.

As described below in additional detail, in order to extract internal states of a system-on-a-chip during a secure lockdown thereof, internal registers and/or internal memory is read and output from such a system-on-a chip before clearing thereof and before reset of such a system-on-a chip, namely disabling ports of such an system-on-a chip. For security reasons, such internal system state information may be encrypted and/or signed prior to output. A key used to encrypt such internal state information may be a same key used to encrypt a boot image. A user may then decrypt such internal state information at a trusted location. In addition to being informed by such internal state information as to a reason for initiation of a secure lockdown mode without adversely affecting security, if a boot image is actually hacked, then a user may be better informed for mitigation by having a more informed knowledge base of a reason for triggering of a secure lockdown mode.

With the above general understanding borne in mind, various configurations for outputting internal states of an integrated circuit after initiation of a secure lockdown mode are generally described below.

Figure 11:
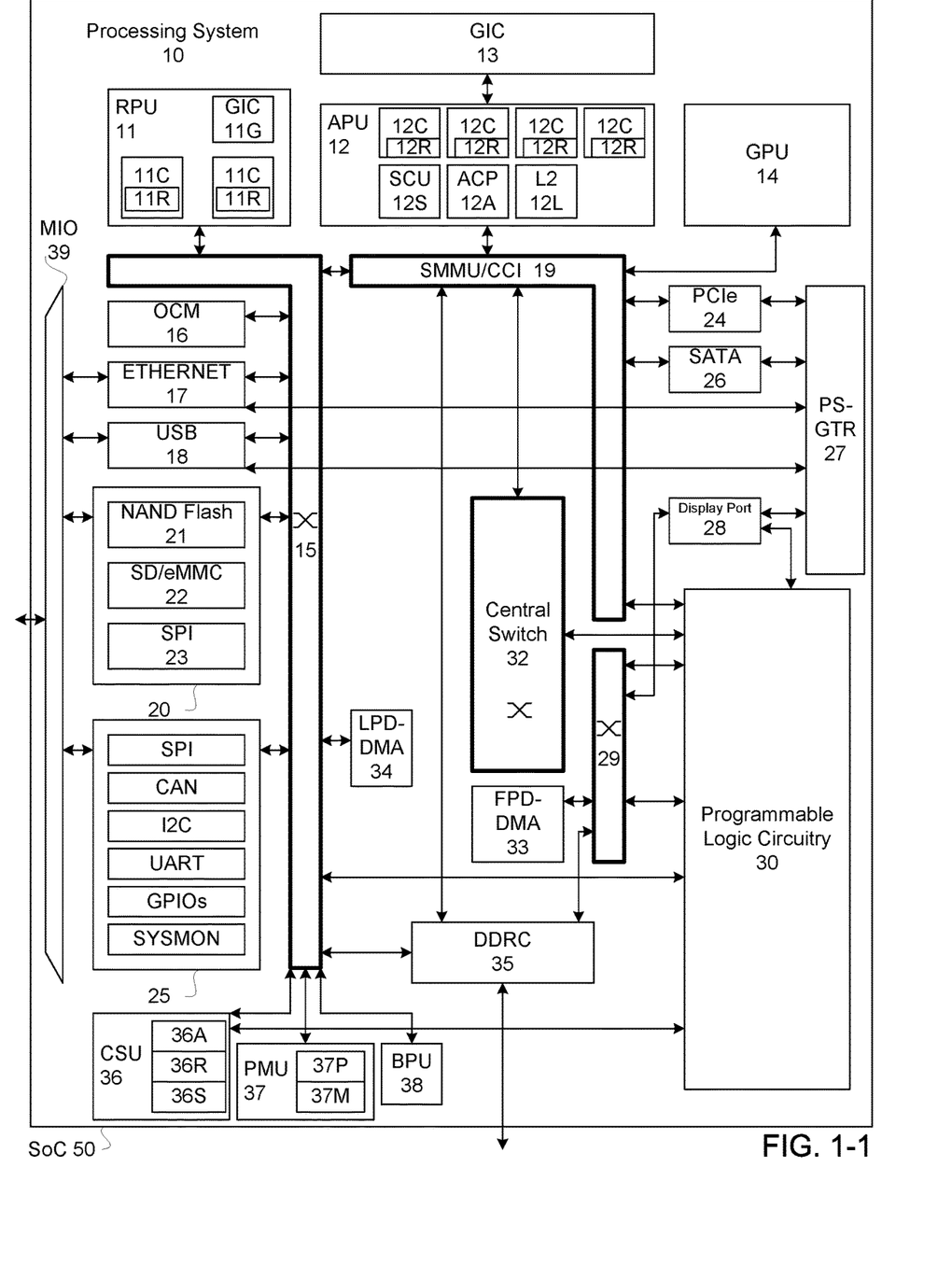

FIG. 1-1 is a block diagram depicting an exemplary processing system 10. Processing system 10 is just one non-limiting example of a processing system that may be used for a System-on-a-Chip ("SoC") of an integrated circuit ("IC"). Accordingly, other processing systems for an SoC or other type of integrated circuit may benefit from technology described herein. Though the following description is generally in terms of a Field Programmable Gate Array ("FPGA") form of SoC, another type of SoC may benefit from the description hereof.

Additional details regarding processing system 10 may be found in "Zynq UltraScale+MPSoC Software Developer Guide" (hereinafter "Software Developers Guide") published by Xilinx, Inc. of San Jose, Calif. as UG1137 (v4.0) May 3, 2017. In particular, processing system 10 is taken from a hardware architecture overview FIG. 2-1 on page 12 of the Software Developers Guide. Bidirectional arrows are generally used in the figures hereof to indicate one-way or two-way communication. In some instances, only one-way or mainly one-way communication may be present in some instances even though a bidirectional arrow is illustratively depicted for purposes of convenience and not limitation.

In this example, processing system 10 of an SoC 50 includes: an Application Processing Unit ("APU") 12 having multiple processing cores 12C, a Level-2 ("L2") cache 12L, a Snoop Control Unit ("SCU") 12S, and an Accelerator Coherence Port ("ACP") 12A; a Real-time Processing Unit ("RPU") 11 having multiple processing cores 11C and a Generic Interrupt Controller ("GIC") 11G; a Graphics Processing Unit ("GPU") 14; a GIC 13; a crossbar switch 15; a crossbar switch 29; a central crossbar switch 32; on-chip memory ("OCM") 16; and a System Memory Management Unit/Cache Coherent Interconnect ("SMMU/CCI") 19. APU 12 and RPU 11 in this example are for an ARM Cortex architecture of ARM Holdings Public Limited Company; however, in another example, a different ARM processor architecture or a non-ARM processor architecture may be used, such as an Intel, AMD, or other processor architecture. As is known, processor cores, such as 11C and 12C include processor stacks formed of registers. Accordingly, processing cores 11C and 12C respectively include processor stacks 11R and 12R. Moreover, processing cores 11C and 12C may include data and/or instruction caches.

In this example, processing system 10 includes interfaces ("I/F"), such as for communication with internal or external devices with respect to SoC 50. Examples of memory interfaces 20 of such interfaces include: a Secure Digital embedded MultiMediaCard ("SD/eMMC") interface 22; a Serial Peripheral Interface bus ("SPI") 23; and a NAND flash interface 21. Other memory interfaces of processing system 10 are Double-Data Rate ("DDR") memory interfaces, such as of DDR controller ("DDRC") 35, and a Serial Advanced Technology Attachment ("SATA") interface 26.

In this example, processing system 10 further includes general connectivity interfaces, such as a Universal Serial Bus ("USB") 18, Peripheral Component Interconnect Express ("PCIe") 24, an Ethernet interface 17. Additional interfaces of interfaces 25 include: a system monitor ("sysmon"), a Universal Asynchronous Receiver/Transmitter ("UART") interface, a Controller Area Network ("CAN") interface, an Inter-Integrated Circuit ("I2C") interface, a General Purpose Input/Output ("GPIO") interface, and an SPI. Interfaces 20 and 25, as well as USB 18 and Ethernet interface 17, may be coupled to a multipurpose input/output ("MIO") interface 39. A system monitor in this example may include an analog-to-digital converter ("ADC"), as well as temperature, voltage, and current sensor-monitor circuits.

In this example, processing system 10 includes: a parallel/serial gigabit transceiver ("PS-GTR") 27, a Display Port 28, a Low-Power Domain Direct Memory Access ("LPD-DMA") interface 34, a Full-Power Domain-DMA ("FPD-DMA") interface 33, and Programmable Logic Circuitry 30. Programmable logic circuitry 30 may include not as yet programmed programmable circuitry hardware, as well as pre-programmed programmable circuitry hardware.

In this example, processing system 10 further includes: a Configuration Security Unit subsystem ("CSU") 36, a Platform Management Unit subsystem ("PMU") 37, and a battery-power unit ("BPU") 38. BPU 38 may include battery-backed random access memory ("BBRAM") and a Real-Time Clock ("RTC") circuit, not shown.

In this example, a low-power domain of processing system 10 includes RPU 11, PMU 37, and CSU 36. In contrast, a programmable logic ("PL") power domain includes programmable logic circuitry 30, and a full-power domain includes APU 12.

CSU 36 includes security circuits. In this example, CSU 36 includes Advanced Encryption Security ("AES"), Rivest-Shamir-Adleman ("RSA"), and Secure Hash Algorithm ("SHA3") circuitry 36A, 36R, and 36S, respectively. PMU 37 is generally for power sequencing, safety, and debugging, as well as security. PMU 37 includes a processor system 37P and random access memory 37M. Additional details regarding processing system 10 may be found in "Zynq UltraScale+MPSoC Technical Reference Manual" (hereinafter "TRM") published by Xilinx, Inc. of San Jose, Calif. as UG1085 (v1.5) Mar. 31, 2017. In particular, PMU 37 and CSU 36 are described in Chapter 12, pages 211-262 of the TRM.

After a system reset of SoC 50, PMU 37 automatically initializes SoC 50, and CSU 36 read-only memory ("ROM") executes a first stage boot loader ("FSBL") from a selected external boot device. SoC 50 may be booted either securely or non-securely. A secure boot may include an encrypted boot image, an authenticated boot image, or an encrypted and authenticated boot image, the latter of which is for a higher-level of security than the other two. In this example, CSU 36 includes a triple redundant processor to control a boot flow and support both secure and non-secure boots.

A programmable logic ("PL") configuration bitstream can be applied securely or non-securely. At a minimum, a boot process involves a boot ROM and an FSBL. A CSU 36 boot ROM may be factory programmed for security. Generally, such boot ROM may determine whether a boot is secure or non-secure, perform some system initialization and cleanups, read mode pins to determine a primary boot device, and execute a FSBL. Optionally, a Joint Test Action Group ("JTAG") interface may be activated to provide access to processing system 10, including programmable logic circuitry 30, for testing and debugging purposes.

Figure 12:
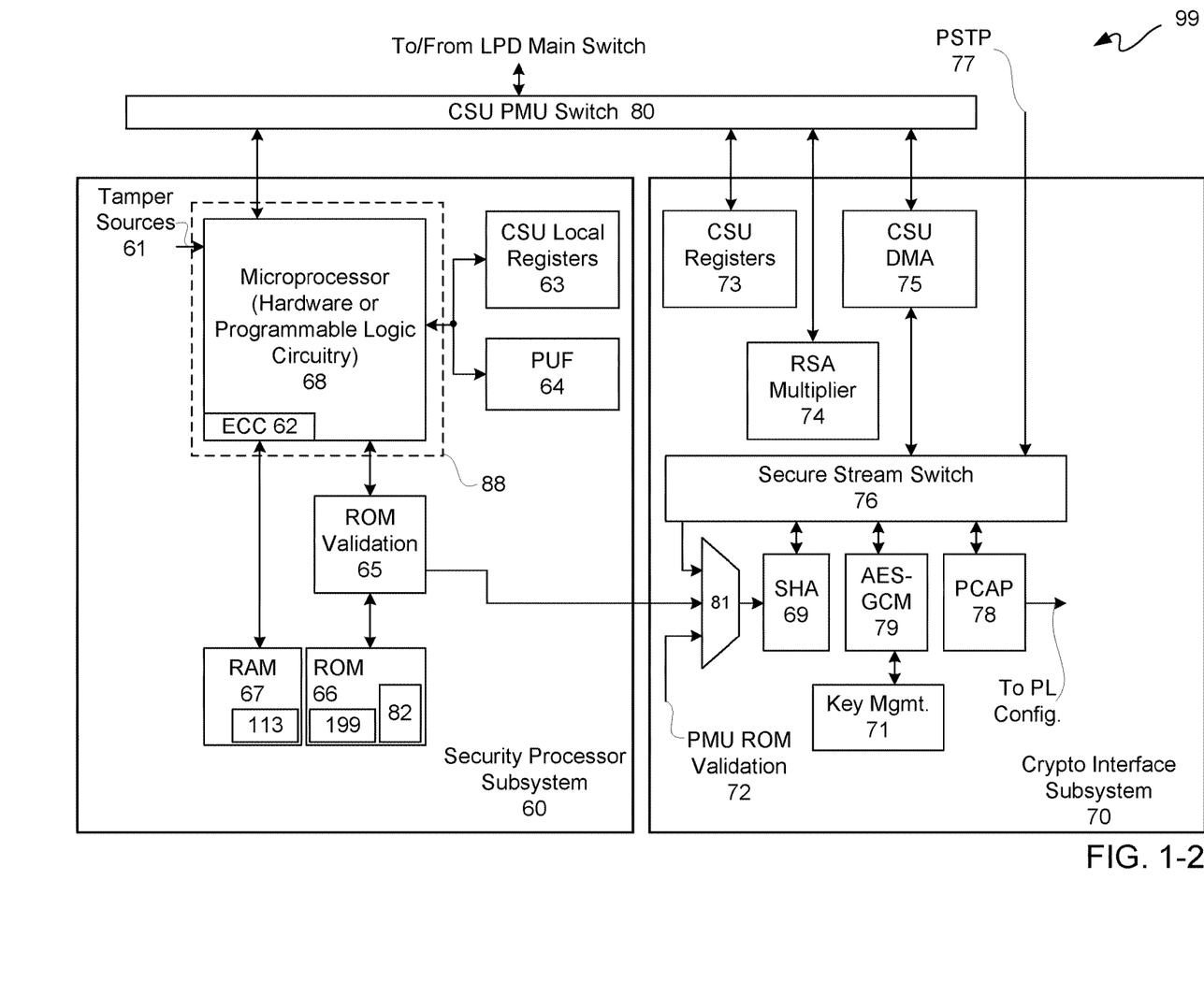

FIG. 1-2 is a block diagram depicting an exemplary CSU 99. CSU 99 may be a CSU 36 of FIG. 1-1. CSU 99 is further described with simultaneous reference to FIGS. 1-1 and 1-2. Not all interconnections of CSU 99 are depicted for purposes of clarity and not limitation.

CSU 99 includes a CSU PMU switch 80, which may be coupled for bidirectional communication with an LPD switch 15. CSU PMU switch 80 may be coupled for bidirectional communication with security processor subsystem 60 and crypto interface subsystem 70 both of CSU 99.

In this example, security processor subsystem 60 includes a microprocessor 68, local registers 63, a physical unclonable function ("PUF") device 64, ROM validation circuitry 65, ROM 66, and RAM 67. Microprocessor 68, though coupled to CSU PMU switch 80, may be configured so as not to be user accessible for enhanced security. Microprocessor 68 may include error correcting code circuitry 62 coupled to RAM 67. Microprocessor 68 may be configured in dedicated hardware or programmable logic circuitry. With respect to configuration using programmable logic circuitry to provide microprocessor 68 with a factory programmed configuration bitstream or other configuration information format stored in SoC 50, ROM 66 may store one or more configuration images 82, as well as other configuration information. ROM validation circuitry 65 may be coupled between microprocessor 68 and ROM 66 for validation of configuration information for instantiation and boot of a microprocessor 68 in programmable logic circuitry. In this example, a triple redundant MicroBlaze™, which is a 32-bit RISC soft processor core from Xilinx, Inc. of San Jose, Calif., is used; however, in another implementation another microprocessor or a microcontroller may be used. Moreover, a single microprocessor core or multiple redundant microprocessor cores may be used. Moreover, in this example, an SHA3 integrity check is used on ROM code prior to execution thereof; however, in another example a different type of integrity check may be used. Along those lines, SHA hardened core 69 of crypto interface subsystem 70 may be coupled to ROM validation circuitry 65 through a multiplexer 81 of crypto interface subsystem 70. A PMU ROM validation signal 72 may be another input to multiplexer 81.

CSU local registers 63 and a PUF device 64 are coupled to microprocessor 68. PUF 64 may be used for generation of an encryption key, such as for example a device-unique encryption key.

In this example, crypto interface subsystem 70 includes: CSU registers 73, an RSA multiplier 74, and a CSU DMA engine 75, each of which may be coupled to CSU PMU switch 80. RSA multiplier 74 may be an exponential multiplier accelerator hardened core. CSU DMA engine 75 may further be coupled to a secure stream switch 76. Secure stream switch 76 may be connected to multiplexer 81, AES-GCM (AES-Galois/Counter Mode) hardened core 79, and a processor configuration access port ("PCAP") 78. Secure stream switch 76 may be connected to SHA hardened core 69. AES-GCM circuitry 79 is connected to key management circuitry 71. Key management circuitry 71 may include BBRAM and eFuse key storage, among other stores or vaults. A device key can be a BBRAM key, a boot image key, an eFuse key, an operational key (such as obtained from a secure header using a plain text key), a PUF key encryption key ("PUF KEK"), a family key (such as a constant or same AES key value hard-coded into a family of devices), or a key update register (a user provided key source after boot). Additionally, a pseudo-stop bit ("PSTP") 77 or other interrupt may be provided to secure stream switch 76, such as for a pseudo stop ("wait") mode or full stop mode.

For a secure boot, RSA multiplier 74 and SHA3 hardened core 69 may be used to authenticate an image, such as a boot image, and AES-GCM hardened core 79 may be used to decrypt an image, such as a boot image. Data may be moved into and out of crypto interface subsystem 70 using CSU DMA engine 75 and secure stream switch 76, and crypto interface subsystem 70 includes key vaults and key management functionality for keys used during a boot. Access to programmable logic circuitry 30 configuration memory may be via PCAP 78.

One or more tamper source signals 61 may be provided to microprocessor 68. Generally, after boot of SoC 50, temperature, voltage, current, single-event upset, JTAG interface, and/or other tamper monitors may provide tamper source signals 61 to monitor SoC 50 with respect to tampering thereof.

Unfortunately in the past, responsive to a secure lockdown mode, internal storage devices were cleared and ports of an SoC 50 were shut down by a system reset before internal states could be read and output. Thus, for example, internal states, such as of system registers, error registers, on-chip memory, processor registers or stacks, and other storage used for holding internal states, were lost, and accordingly debugging activities, which could have been informed by such internal states, were more problematic due to an inability to obtain such internal states.

Figure 21:
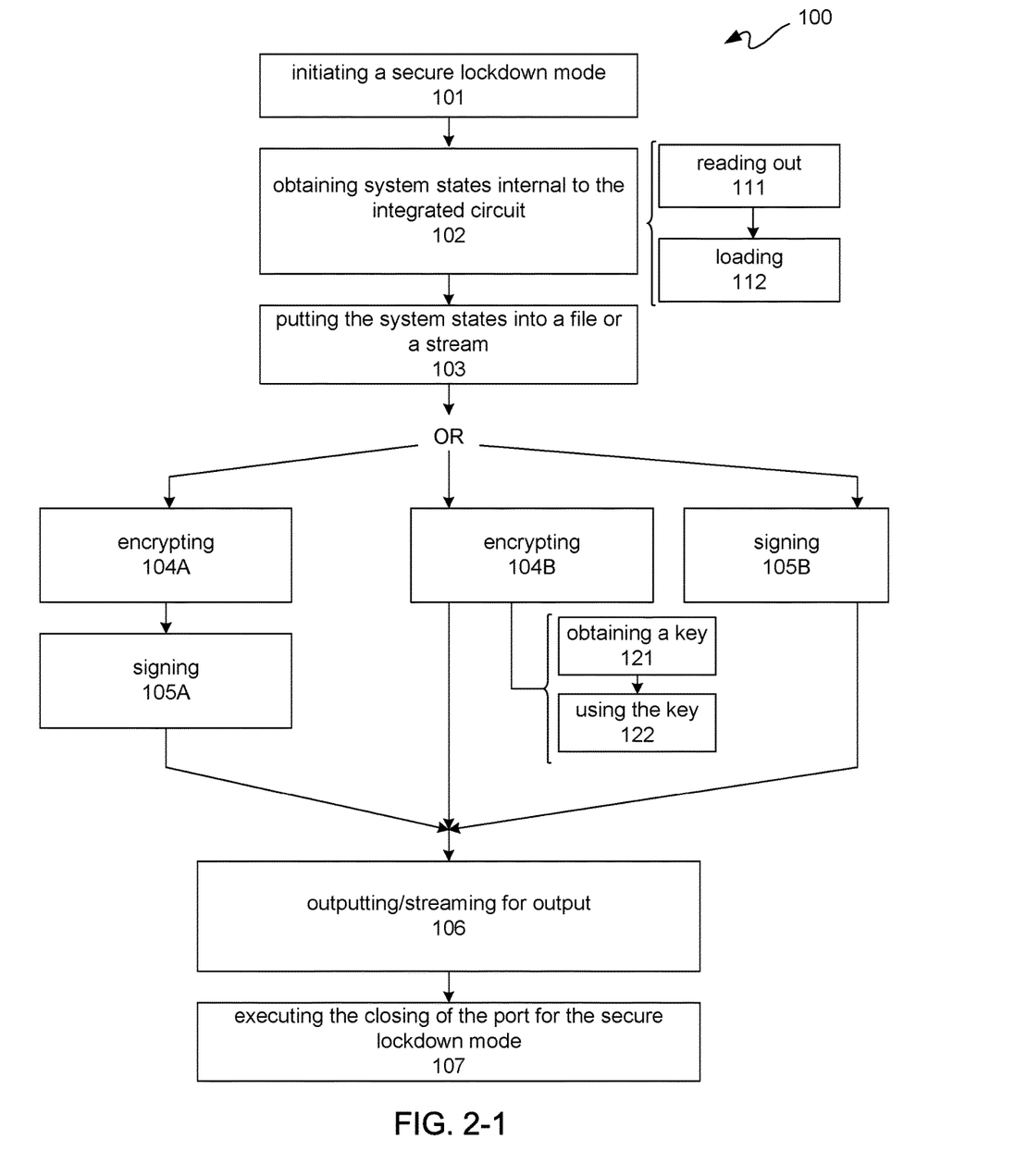

FIG. 2-1 is a flow diagram depicting an exemplary internal states output flow 100 for output from an integrated circuit. Internal state output flow 100 may be used for getting internal state information, such as for example internal system states, out of an integrated circuit after initiation of a secure lockdown mode and before closing an output port in response to such secure lockdown mode. Such internal state information of an integrated circuit may include an SoC, such as SoC 50 of FIG. 1-1 for example.

At operation 101, a secure lockdown mode for SoC 50 may be initiated. After initiation of a secure lockdown mode at operation 101, and prior to a clearing of internal storage devices and a reset of SoC 50 closing ports thereof, operations 102 through 106 may be performed as described below. An initiation of a secure lockdown mode may be initiated out of a security engine, such as may be implemented using microprocessor 68. Thus for example, responsive to assertion of a tampering detected source signal 61, microprocessor 68 may be configured to initiate and execute a secure lockdown of SoC 50.

At operation 102, system states internal to SoC 50 may be obtained. Along those lines, at operation 102 information, including system states, internal to SoC 50 may be captured prior to completion of a lockdown of SoC 50 in response to initiation of a secure lockdown mode at operation 101.

Operation 102 may include a reading out operation 111 and a loading operation 112. For example, at operation 111, system states may be read out from at least one of a register, a cache, an on-chip memory, or a processor stack of storage devices of a processor system 10 of SoC 50. For example, at operation 111 system states may be read out of OCM 16, processor stacks 11R, processor stacks 12R, L2 cache 12L, and/or CSU registers 73 of processing system 10.

At operation 112, system states internal to processing system 10 read out from storage devices thereof at operation 111 may be written or otherwise loaded into a temporary storage device of SoC 50. For example, system states 113 read out at operation 111 may be stored in RAM 67 of a security subsystem 99. After storage of internal system states in memory in security subsystem 99, such system states may be erased or cleared from internal storage devices of SoC 50 other than such memory in security subsystem 99. Thus, for example information may be read and then written into memory accessible by security engine, where microprocessor 68 may be configured to provide a security engine. Such information may be obtained from internal storage devices, including registers, caches, processor stack, and on-chip memory, internal to SoC 50 but not RAM 67, and then such internal storage devices not RAM 67 may be erased or cleared. This information in RAM 67 may be output from SoC 50 prior to completion of a secure lockdown of SoC 50, such as prior to a system reset of SoC 50. Such system state information may be useful in a debugging a boot image used on SoC 50 or other debugging operation.

Optionally, a secure lockdown reset, such as a power-on-reset or a power down of SoC 50, may be used to erase or clear internally read and stored system states 113, including system states stored for example in RAM 67. However, at operation 103 system states 113 stored in RAM 67 may be put into a file or other container format or may be put into a data stream. There are many types of file or stream formats that may be used, such as for example respectively a binary file format and an XML stream format, among others. Moreover, a text or a non-text file format may be used.

After putting system states 113 into a file or a stream format at operation 103, such file or stream including system states 113 may be encrypted and/or signed as described below. Code 199 may be stored in ROM 66 for example, where code 199 is for executing one or more operations of internal states output flow 100. Code 199 may be in any of a variety of formats compatible with operation of microprocessor 68.

At operation 104б, a file or stream including system states 113 may be provided to an encryption engine of a CSU 99 to provide an encrypted file or stream including system states 113. Optionally, an encrypted file or stream including system states 113 need not be signed or encrypted, and may be directly provided for output at operation 106. However, this direct output without encrypting and/or signing may be for use in non-secure applications.

Microprocessor 68 responsive to code 199, such as obtained from ROM 66, may be programmed to provide a stream or a file including system states 113 to a security engine of a security subsystem. For the example, microprocessor 68 may be configured to be or be part of a security engine 88, which may include ECC circuitry 62. An encryption engine may be provided with AES-GCM 79 to provide an encrypted file or stream of system states 113.

Optionally, no encryption need be performed, and system states 113 may be signed at operation 105б to provide a signed file or stream including system states 113. Optionally, a signed file or stream including system states 113 may be provided for output at operation 106. Microprocessor 68 responsive to code 199, such as obtained from ROM 66, may be programmed to provide a file or stream including system states 113 to a signing engine, such as provided with RSA multiplier 74 and/or SHA3 hardened core 69 for example, of a security subsystem to provide a signed file or stream with system states 113.

Optionally, both encryption and signing may be performed respectively at operations 104A and 105A. At operation 104A, same as operation 104B, a file or a stream including system states 113 may be provided to an encryption engine to provide an encrypted file or stream having system states 113. Encryption at each of operations 104A and 104B may include obtaining a key stored, generated or embedded in SoC 50 at operation 121, and then at operation 122 using such a key obtained at 121 for encrypting of a file or stream having system states 113.

Such encrypted file or stream having system states 113 may be provided to a signing engine at operation 105A, similar to operation 105B though an encrypted file or stream is signed to provide a signed file or stream, respectively. More particularly, an encrypted-signed file or stream may be provided. Such a signed file or stream including system states 113 may be provided for output at operation 106.

At operation 106, system states 113 may be output as either or both encrypted or signed via a port of SoC 50 before closing such port responsive to a secure lockdown mode initiated at operation 101. After output of such system states 113, such port used for such output operation 106 may be closed at operation 107 as part of completing execution of a secure lockdown mode initiated at operation 101.

There are a variety of ways a secure lockdown mode may be initiated. For example, a user may deliberately initiate a secure lockdown mode after a boot of SoC 50. In another example, a secure lockdown mode may be initiated as a result of an attempt to load SoC 50 with an invalid boot image. In another example, a secure lockdown mode may be initiated as a result of tampering with SoC 50. These or other initiations of a secure lockdown mode may occur.

Figure 22:
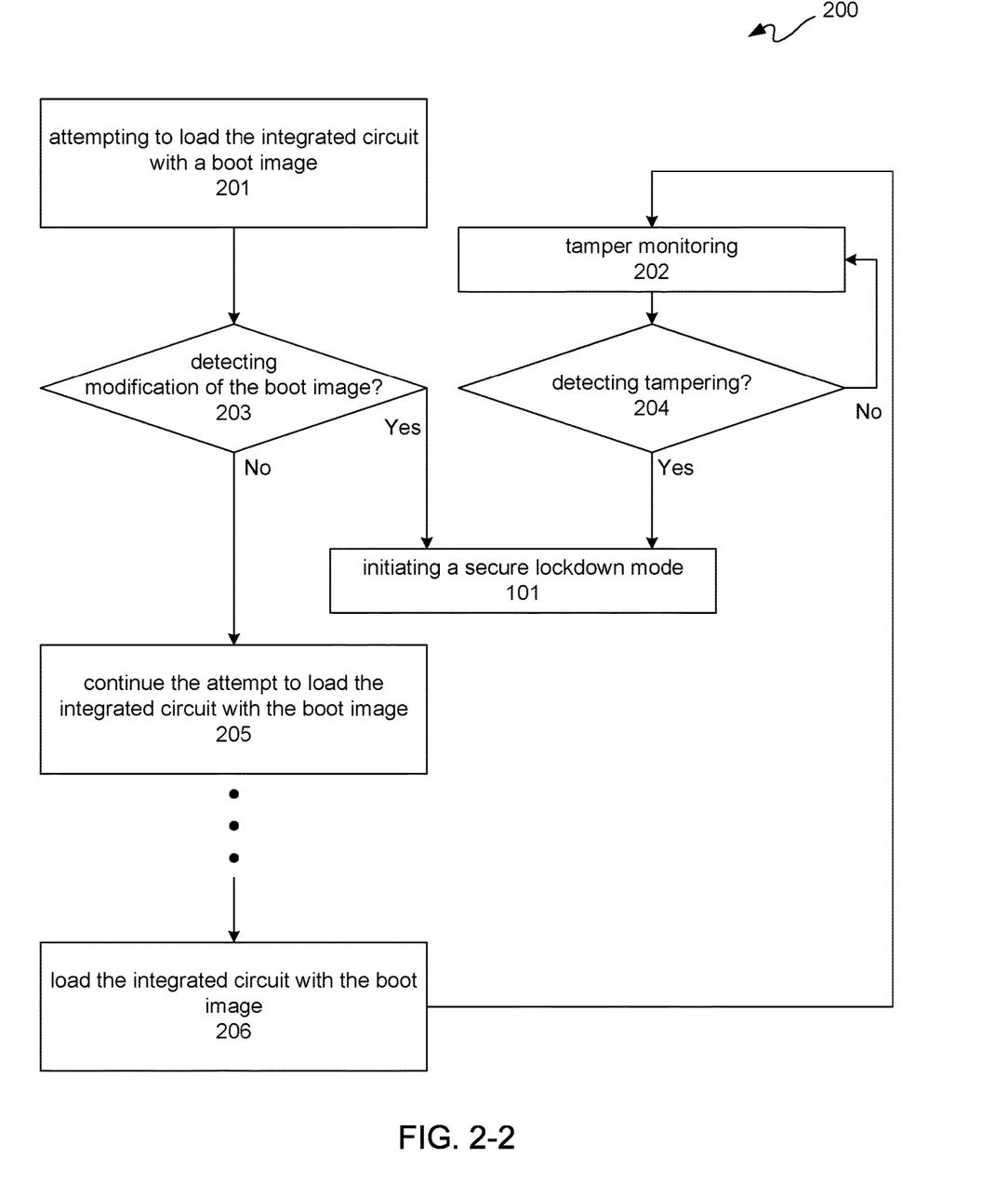

FIG. 2-2 is a flow diagram depicting an exemplary initiation of a secure lockdown mode flow 200. Initiation of secure lockdown mode flow 200 may be used to initiate a secure lockdown mode at operation 101 of internal states output flow 100 of FIG. 2-1. Initiation of secure lockdown mode flow 200 is further described with simultaneous reference to FIGS. 1-1 through 2-2.

At operation 201, an attempt to load an integrated circuit, such as SoC 50 for example, with a boot image may be performed. A loading of an SoC 50 with a boot image may be initiated at operation 201. After a boot image is loaded, such as at load boot image operation 206, tamper monitoring of SoC 50 may be initiated at operation 202 and continue in a loop. Along those lines, tamper monitoring at 202 may include receiving tamper source signals 61 by microprocessor 68, as previously described. If microprocessor 68 detects tampering responsive to one or more of tamper source signals 61 at operation 204, then a secure lockdown mode may be initiated at 101. If, however, microprocessor 68 does not detect tampering at operation 204 responsive to one or more of tamper source signals 61, then tamper monitoring may continue at 202 as part of a loop.

At operation 203, a determination may be made as to whether a boot image attempted to be loaded at 201 has been tampered with or otherwise modified. If it is determined at operation 203 that such a boot image has not been tampered with or otherwise modified, then at operation 205 such an attempt to load such a boot image continues, which may result in loading of a boot image into SoC 50 at operation 206. If, however, tampering or other modification of such a boot image is detected at operation 203, then such a boot image is not loaded into SoC 50 and a secure lockdown mode may be initiated at operation 101.

Figure 3:
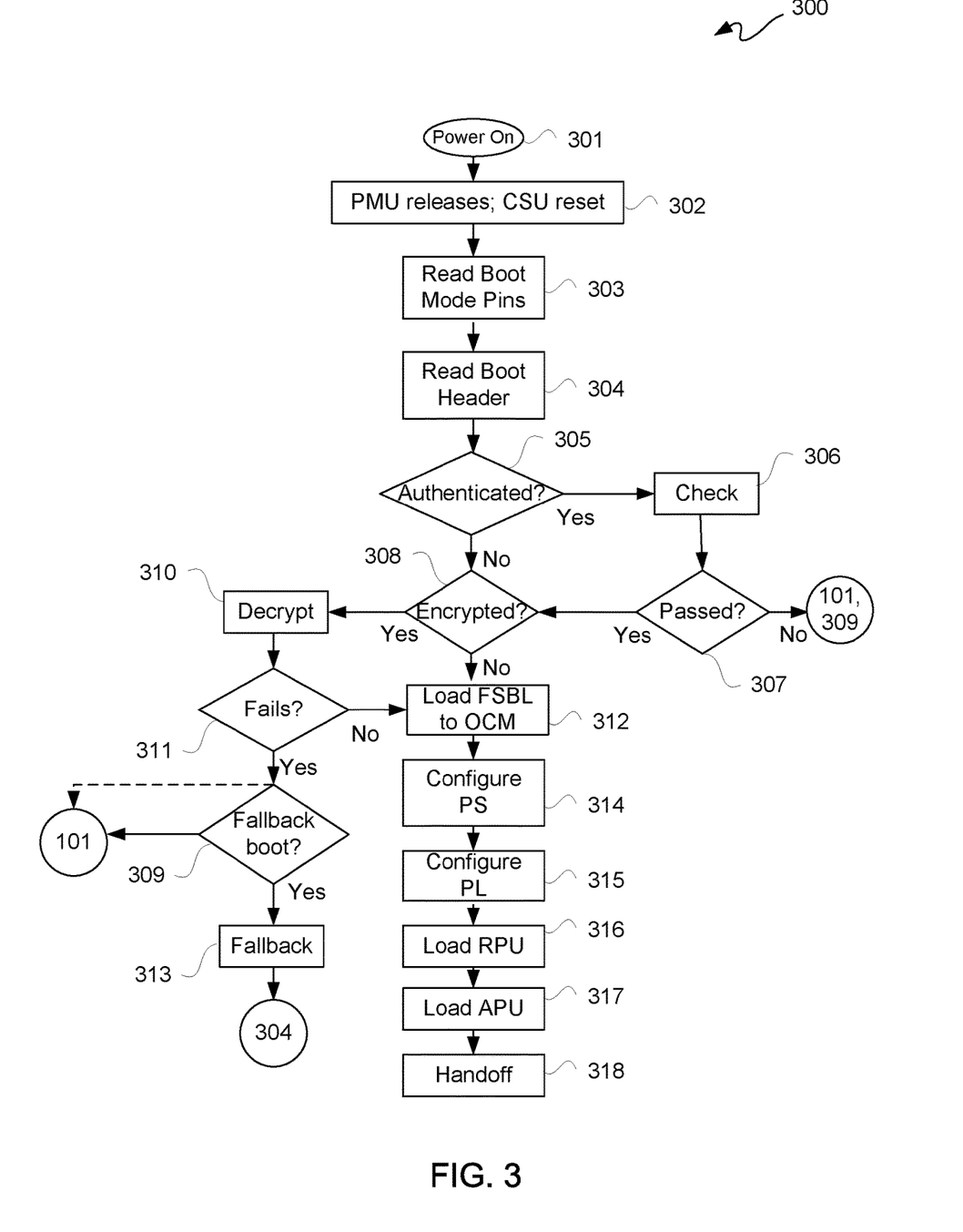
FIG. 3 is a flow diagram depicting an exemplary boot flow.

FIG. 3 is a flow diagram depicting an exemplary boot flow 300. Boot flow 300 may be for SoC 50 of FIG. 1-1. Boot flow 300 is a non-limiting example of a fallback boot flow; however, a multi-boot flow, a non-fallback/non-multi-boot flow, or other boot flow may be used. Boot flow 300 is further described with simultaneous reference to FIGS. 1-1 through 3. However, many details regarding boot flow 300 are described with reference to FIG. 7-8 on page 69 of the Software Developers Guide, and so many of those published details are not described in unnecessary detail for purposes of clarity and not limitation.

At operation 301, a power on or power on reset is performed for SoC 50. At operation 302, PMU 37 releases CSU 36 to reset.

At operation 303, CSU 36 reads boot mode pins, such as of SoC 50. At operation 304 a boot header of a boot image is read by CSU 36. Such a boot image may be provided from an external memory device, network connection, or other port of SoC 50 usable for booting SoC 50 with a boot image. A boot image may be a user generated boot image, as is known. Generally, operations 303 through 313 may be performed by CSU 36. A boot image may include a boot header and one or more partitions for one or more different images alone with one or more partition headers.

At operation 305, it may be determined whether an authentication check of a first stage boot loader ("FSBL") for a boot header read at operation 304 is to be performed. A partition of a boot image may include an FSBL partition.

At operation 306, an authentication check of such a boot image may be performed responsive to a boot image having an authentication header. An authentication check at operation 306 may be performed using an authentication key stored or embedded in SoC 50. A partition of a boot image may include an authentication certificate. Other examples of partitions include a bitstream partition with or without encryption, a U-boot partition with or without encryption, or a Linux or other operating system partition with or without encryption, among other examples. Examples of partition header attributes may include vector location, bitstream block size, early handoff, endianness, partition owner (e.g., FSBL or U-boot), checksum type, destination CPU, encryption present bit, and/or destination device identifier, among other examples.

Processor system 10 may be initialized such as with register initialization for example. Load of a boot image may then be attempted, such as a boot.bin image file for example. Boot image parameters may include for example a version, count of image header(s), partition header word offset(s), image header word offset(s), header authentication certificate word offset(s), boot device identifier (e.g., IC, QSPI, NAND, SD, MMC, USB, Ethernet, PCIE, or SATA), and/or checksum, among other examples. Partition headers may have address offsets to parameters along the lines described herein. An authentication certificate may include a secondary public key ("SPK") identification, an SPK signature, a boot header signature, and/or a partition signature, among other parameters. An authentication certificate header may include a primary public key ("PPK"), a hash algorithm, and/or a public encryption algorithm, among other fields.

If, at operation 307 it is determined that an authentication check at operation 306 failed, then for a non-fallback/non-multi-boot flow, a secure lockdown mode may be initiated at operation 101 responsive to such a boot image failing such an authentication check. However, for a fallback boot or a multi-boot, another boot image may be processed, such as determined at operation 309 if another boot image is to be processed in this fallback boot example, until either a boot image successfully loads or all boot images fail to load.

If, however, an authentication check at operation 306 passes as determined at operation 307, then at operation 308 it is determine whether a boot image, or more particularly an FSBL thereof, is encrypted. If an FSBL is not to be authenticated as determined at operation 305, then a check as to whether an FSBL of such a boot image being processed is encrypted may be performed.

If at operation 308 it is determined whether a boot image, or more particularly an FSBL thereof, is encrypted, then such an encrypted FSBL may be processed for decryption at operation 310. If decryption at operation 310 is successful as determined at operation 311, then CSU 36 causes loading of such an FSBL into OCM 16 at operation 312. Attempting decryption of an FSBL at operation 310 involves using a decryption key stored, generated or embedded in SoC 50. A decryption key is a different key than an authentication key used for an authentication check at operation 306. Moreover, if it is determined at 308 such an FSBL is not encrypted, then CSU 36 causes loading of such an FSBL into OCM 16 at operation 312.

For a non-fallback/non-multi-boot flow, failure of an attempt at decryption of an FSBL as determined at operation 311 may invoke initiating of a secure lockdown mode at operation 101, as generally indicated with a dashed line. However, for a fallback boot, or similarly a multi-boot, failure of decryption as determined at operation 311 may involve determining whether a fallback boot image or another boot image is available to be processed as determined at operation 309. If such another boot image is determined at operation 309 to be available for processing, then such a fallback boot image is obtained at operation 313 and subsequently processed as previously described with respect to an initial boot image starting with reading a boot header of such fallback boot image at operation 304.

If, however, all boot images have been processed and failed to have an FSBL respectively associated therewith loaded into OCM at operation 312, then at operation 309 it may be determined that no other boot image is available for booting SoC 50. Responsive to such a decision that no other boot image is available, a secure lockdown mode may be initiated at operation 101.

Assuming a boot image results in an FSBL thereof being loaded at 312, then at operation 314 processing system 10 may be configured with such an FSBL. At operation 315, programmable logic circuitry 30 may be configured with a configuration bitstream or other format of configuration information of FSBL for programmable logic circuitry 30.

At operation 316, such an FSBL loads RPU 11 software, and at operation 317 such an FSBL loads APU 12 software. At operation 318, such an FSBL performs a handoff to APU software loaded at operation 317.

For a fallback boot or a multi-boot, a first boot image of a plurality of boot images may be attempted to be loaded, which initiation of a load of a boot image may result in loading of such a boot image. However, for a boot image to be loaded, such a boot image may have to authenticated before being loaded. Thus, initiation of a load of a boot image may be followed by initiation of an authentication of such a boot image. An attempted authentication of a first authentication certificate associated with a first authentication header of such a first boot image, or more particularly a first FSBL with a first authentication certificate ("AC"), may be used. Responsive to such a first authentication header or certificate failing an authentication check thereof, a second boot image of such a plurality of boot images may be attempted to be loaded by initiating loading thereof. Again, this initiation of loading a boot image may be followed by initiation of an attempted authentication of a second authentication certificate associated with a second authentication header of a second boot image, or more particularly a second FSBL with a second authentication certificate. Accordingly, for a fallback boot or a multi-boot, boot images of a plurality of boot images may be sequentially processed until an FSBL thereof loads or until all boot images of such plurality of boot images have been processed and no FSBL thereof loads.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 4:
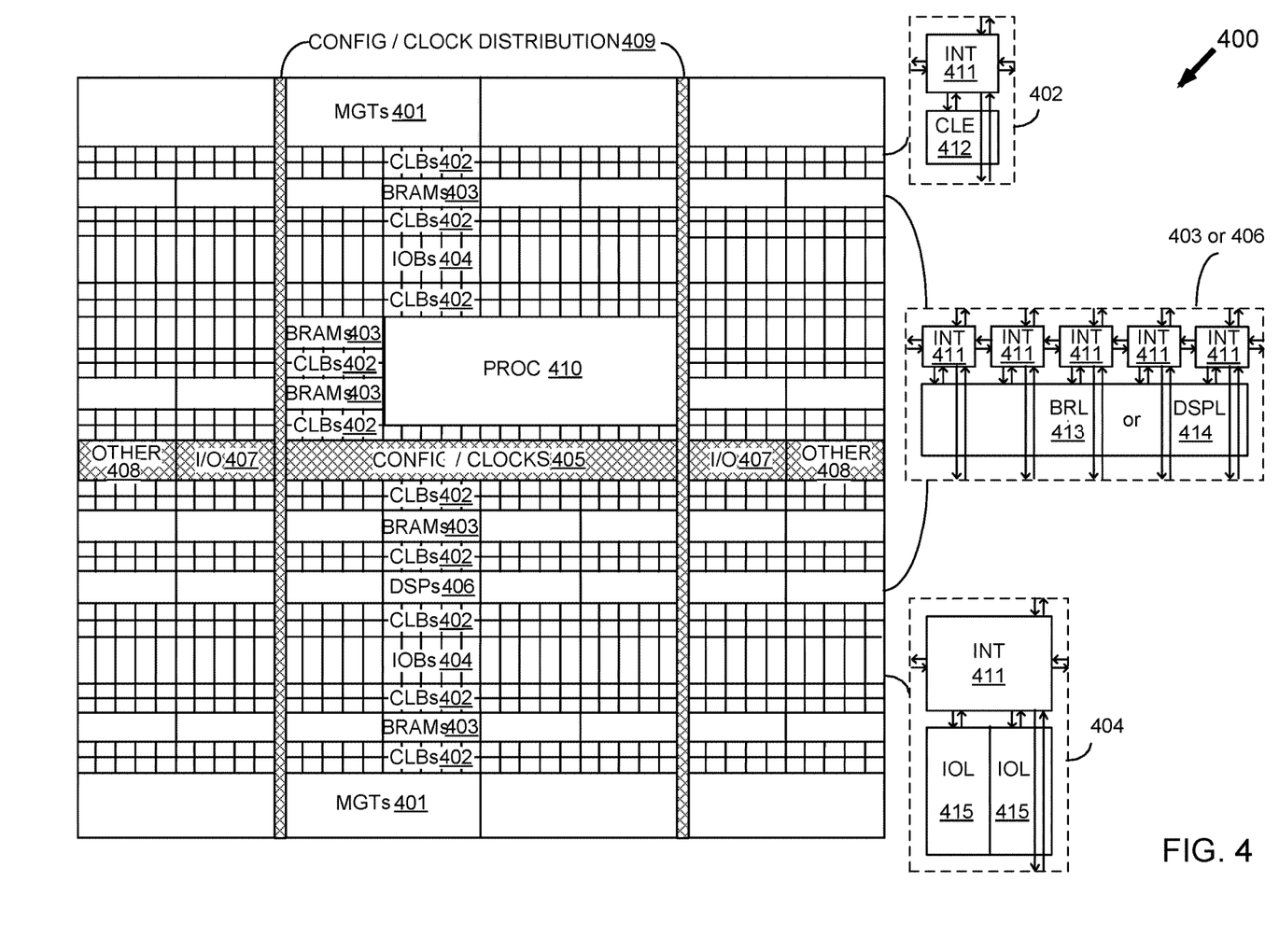
FIG. 4 is a simplified block diagram depicting an exemplary columnar Field Programmable Gate Array ("FPGA") architecture.

As noted above, advanced FPGAs can include several different types of programmable logic blocks in the array. For example, FIG. 4 illustrates an FPGA architecture 400 that includes a large number of different programmable tiles including multi-gigabit transceivers ("MGTs") 401, configurable logic blocks ("CLBs") 402, random access memory blocks ("BRAMs") 403, input/output blocks ("IOBs") 404, configuration and clocking logic ("CONFIG/CLOCKS") 405, digital signal processing blocks ("DSPs") 406, specialized input/output blocks ("I/O") 407 (e.g., configuration ports and clock ports), and other programmable logic 408 such as digital clock managers, analog-to-digital converters, system monitoring logic, and so forth. Some FPGAs also include dedicated processor blocks ("PROC") 410.

In some FPGAs, each programmable tile includes a programmable interconnect element ("INT") 411 having standardized connections to and from a corresponding interconnect element in each adjacent tile. Therefore, the programmable interconnect elements taken together implement the programmable interconnect structure for the illustrated FPGA. The programmable interconnect element 411 also includes the connections to and from the programmable logic element within the same tile, as shown by the examples included at the top of FIG. 4.

For example, a CLB 402 can include a configurable logic element ("CLE") 412 that can be programmed to implement user logic plus a single programmable interconnect element ("INT") 411. A BRAM 403 can include a BRAM logic element ("BRL") 413 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element ("DSPL") 414 in addition to an appropriate number of programmable interconnect elements. An 10B 404 can include, for example, two instances of an input/output logic element ("IOL") 415 in addition to one instance of the programmable interconnect element 411. As will be clear to those of skill in the art, the actual I/O pads connected, for example, to the I/O logic element 415 typically are not confined to the area of the input/output logic element 415.

In the pictured embodiment, a horizontal area near the center of the die (shown in FIG. 4) is used for configuration, clock, and other control logic. Vertical columns 409 extending from this horizontal area or column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, processor block 410 spans several columns of CLBs and BRAMs.

Note that FIG. 4 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 4 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for an integrated circuit, comprising:
   initiating a secure lockdown mode for the integrated circuit;
   obtaining system states of a system internal to the integrated circuit after initiation of the secure lockdown mode, the obtaining comprising:
   reading out the system states from storage devices internal to the integrated circuit; and
   loading the system states into temporary storage of the integrated circuit; and
   outputting the system states via a port of the integrated circuit before closing the port responsive to the secure lockdown mode.

2. The method according to claim 1, further comprising putting the system states into a file.

3. The method according to claim 2, further comprising performing at least one of:
   encrypting the file using a security subsystem internal to the integrated circuit to provide an encrypted file; or
   signing either the file or the encrypted file using the security subsystem.

4. The method according to claim 2, further comprising:
   obtaining a key stored, generated or embedded in the integrated circuit; and
   encrypting the file using a security subsystem internal to the integrated circuit using the key for the encrypting of the file.

5. The method according to claim 1, wherein the outputting of the system states is either or both encrypted and signed via the port of the integrated circuit before closing the port responsive to the secure lockdown mode.

6. The method according to claim 1, wherein the system states are read out from at least one of a register, a cache, an on-chip memory, or a processor stack of the storage devices.

7. The method according to claim 1, further comprising:
   initiating loading of the integrated circuit with a boot image;
   monitoring the system for tampering;
   initiating the secure lockdown mode responsive to detecting modification of the boot image or detecting tampering with the system; and
   executing closing of the port for the secure lockdown mode.

8. The method according to claim 7, further comprising:
   determining whether an authentication check of the boot image is to be performed;
   performing the authentication check of the boot image using an authentication key stored or embedded in the integrated circuit; and
   wherein the initiating of the secure lockdown mode is responsive to the boot image failing the authentication check.

9. The method according to claim 7, further comprising:
   determining whether the boot image is encrypted;
   initiating decryption of the boot image using a decryption key stored, generated or embedded in the integrated circuit; and
   wherein the initiating of the secure lockdown mode is responsive to the boot image failing the decryption thereof.

10. The method according to claim 1, further comprising loading the system states into a security subsystem of the system before the closing of the port responsive to the secure lockdown mode.

11. The method according to claim 10, further comprising putting the system states into a stream.

12. The method according to claim 11, further comprising performing at least one of:
    encrypting the stream using the security subsystem internal to the integrated circuit to provide an encrypted stream; or
    signing either the stream or the encrypted stream using the security subsystem.

13. The method according to claim 12, further comprising streaming the stream either or both encrypted and signed for output via a port of the integrated circuit before closing the port responsive to the secure lockdown mode.

14. The method according to claim 1, further comprising:
    initiating loading of the integrated circuit with a first boot image of a plurality of boot images, the first boot image having a first authentication header;
    performing a first authentication check of a first authentication certificate associated with the first authentication header;
    responsive to the first authentication header failing the first authentication check,
      obtaining a second boot image of the plurality of boot images;
      initiating loading of the integrated circuit with the second boot image having a second authentication header; and
      performing a second authentication check of a second authentication certificate associated with the second authentication header; and
    responsive to the second authentication header failing the second authentication check and no remaining one of the plurality of boot images for the loading and authenticating thereof, performing the initiating of the secure lockdown mode.

15. The method according to claim 1, wherein:
    the integrated circuit is a system-on-a chip;
    the system states are for debugging a booting of the system-on-a-chip; and
    the initiating of the secure lockdown mode is out of a security engine of the integrated circuit.

16. A system in an integrated circuit, comprising:
    a memory configured to store program code; and
    a security engine having a processor coupled to the memory, wherein the processor, in response to executing the program code, is configured to initiate operations for implementing a secure lockdown mode of the integrated circuit, including:
    obtaining system states of a system internal to the integrated circuit after initiation of the secure lockdown mode, the obtaining comprising:
    reading out the system states from storage devices internal to the integrated circuit; and
    loading the system states into temporary storage of the integrated circuit; and outputting the system states via a port of the integrated circuit before closing the port responsive to the secure lockdown mode.

17. The system according to claim 16, wherein the system states are output as a file.

18. The system according to claim 16, wherein the system states are output as a stream.

19. The system according to claim 16, wherein the security subsystem is configured to encrypt and sign the system states for the output thereof.

20. The system according to claim 16, wherein the system states are read out from at least one of a register, a cache, an on-chip memory, or a processor stack of the storage devices.

* * * * *